United States Patent [19]

Brindoepke

[11] Patent Number: 5,332,785
[45] Date of Patent: Jul. 26, 1994

[54] LIQUID COATING COMPOSITION COMPRISING ACETOACETATE MODIFIED EPOXY RESIN AND BLOCKED POLYAMINE

[75] Inventor: Gerhard Brindoepke, Sulzbach/Ts., Fed. Rep. of Germany

[73] Assignee: Hoechst Aktiengesellschaft, Fed. Rep. of Germany

[21] Appl. No.: 39,948

[22] Filed: Mar. 29, 1993

[30] Foreign Application Priority Data

Mar. 30, 1992 [DE] Fed. Rep. of Germany ....... 4210333

[51] Int. Cl.$^5$ .......................... C08F 8/32; C09D 3/727
[52] U.S. Cl. ................................... 525/111; 525/113; 525/523; 525/526; 525/528; 525/529; 525/530; 525/531; 525/532; 525/533; 528/100; 528/107; 528/110; 528/111; 528/113; 528/119; 528/120; 528/123; 427/386
[58] Field of Search ............... 525/528, 533, 526, 113, 525/523, 111, 529, 530, 532, 531; 528/100, 107, 110, 111, 113, 120, 119, 123; 427/386

[56] References Cited

U.S. PATENT DOCUMENTS

| | | | |
|---|---|---|---|
| 3,668,183 | 6/1972 | Hoy et al. | 260/65 |
| 4,016,141 | 4/1977 | Ritz et al. | 525/529 |
| 4,495,335 | 1/1985 | Geist et al. | 525/528 |
| 4,775,735 | 10/1988 | Goel | 528/90 |
| 4,997,907 | 3/1991 | Marten et al. | 528/272 |

FOREIGN PATENT DOCUMENTS

| | | |
|---|---|---|
| 0199087 | 10/1986 | European Pat. Off. |
| 0387692 | 9/1990 | European Pat. Off. |
| 4032751 | 4/1992 | Fed. Rep. of Germany. |

OTHER PUBLICATIONS

Lee and Neville, "Handbook of Epoxy Resins", McGraw-Hill Inc. 1967, pp. 7-25 and 7-26.
Copy of Polyenamine Coatings I-K. L. Hoy et al (6 pages).
Copy of Polenamine Coatings II C. H. Carder et al (6 pages).
Copy of XIX. Fatipec Kongress Aachen 1988 (3 pages).
Copy of Chemical Structure & Coating Properies of . . . binders (10 pgs.).

Primary Examiner—Frederick Krass
Attorney, Agent, or Firm—Bierman and Muserlian

[57] ABSTRACT

A liquid coating composition based on a polymer containing acetoacetate groups and a polyamine in the form of the corresponding aldimine or ketimine, the polymer containing acetoacetate groups being obtained by reacting a polyepoxide containing hydroxyl groups, or a polyepoxide which is partially or completely reacted with monocarboxylic acids, with acetoacetic acid derivatives. These liquid coating compositions are suitable in particular as binders in two-component fillers for automotive refinishing or as two-component primers.

12 Claims, No Drawings

LIQUID COATING COMPOSITION COMPRISING ACETOACETATE MODIFIED EPOXY RESIN AND BLOCKED POLYAMINE

EP-0 199 087 and U.S. Pat. No. 3,668,183 have already disclosed coating compositions which contain as the binder component a polymer containing acetoacetate groups and as the crosslinking agent a polyamine in the form of the corresponding aldimine or ketimine. In the curing of these two-component systems the acetoacetate groups react with the polyamines to form enamine groups (Journal of Paint Technology, Vol. 46, No. 591, pp. 70–76 and pp. 76–81). Known polymers containing acetoacetate groups are based on polyols, polythiols or polyamines (U.S. Pat. No. 3,668,183). The polymers described in EP 199 087 which contain acetoacetate groups are those obtained by addition polymerization of unsaturated monomers, at least one monomer containing a hydroxyl group. This hydroxyl group in the finished polymer is then converted to the acetoacetate group.

DE-4 032 751 discloses liquid coating compositions based on a polymer containing acetoacetate groups and a polyamine in the form of the corresponding aldimine or ketimine, the polymer containing acetoacetate groups being obtained by reacting a polyepoxide with water, with an amine or with a hydroxycarboxylic acid and subsequently carrying out esterification or transesterification with acetoacetic acid derivatives. As a further development of this invention, it has now been found that the polymer containing acetoacetate groups can also be built up from a polyepoxide containing hydroxyl groups or a polyepoxide which is reacted with monocarboxylic acids.

The present invention relates to liquid coating compositions based on a polymer containing acetoacetate groups and a polyamine in the form of the corresponding aldimine or ketimine, the polymer containing acetoacetate groups being obtained by reacting a polyepoxide containing hydroxyl groups, or a polyepoxide which is partially or completely reacted with monocarboxylic acids, with acetoacetic acid derivatives. The reaction with the acetoacetic acid derivatives is carried out as an esterification or transesterification reaction.

The polyepoxides may be either saturated or unsaturated, and may be aliphatic, cycloaliphatic, aromatic or heterocyclic. They may also contain substituents which do not cause any interfering side-reactions under the reaction conditions, for example alkyl or aryl substituents, ether groups and the like.

These epoxide compounds are preferably polyglycidyl ethers based on polyhydric, preferably dihydric, alcohols, phenols, hydrogenation products of these phenols and/or novolaks (reaction products of mono- or polyhydric phenols with aldehydes, in particular formaldehyde, in the presence of acidic catalysts). The epoxide equivalent weights of these epoxide compounds (epoxy resins) are between 100 and 5000, preferably between 160 and 4000. Examples of polyhydric phenols are: resorcinol, hydroquinone, 2,2-bis(4-hydroxyphenyl)propane (bisphenol A), isomer mixtures of dihydroxydiphenylmethane (bisphenol-F), tetrabromobisphenol A, 4,4'-dihydroxydiphenylcyclohexane, 4,4'-dihydroxy-3,3'-dimethyldiphenylpropane, 4,4'-dihydroxybiphenyl, 4,4'-dihydroxybenzophenone, 1,1-bis(4-hydroxyphenyl)ethane, 1,1-bis(4hydroxyphenyl)isobutane, 2,2-bis(4-hydroxy-tert-butylphenyl)propane, bis(2-hydroxynaphthyl)methane, 1,5dihydroxynaphthalene, tris(4-hydroxyphenyl)methane, bis(4-hydroxyphenyl) ether, bis(4-hydroxyphenyl) sulfone etc. and the products of chlorination and bromination of the abovementioned compounds. Bisphenol A and bisphenol F are particularly preferred in this respect.

Also suitable are the polyglycidyl ethers of polyhydric alcohols. Examples of such polyhydric alcohols are ethylene glycol, diethylene glycol, triethylene glycol, 1,2-propylene glycol, polyoxypropylene glycols (n=1–10), 1,3-propylene glycol, 1,4-butylene glycol, 1,5-pentanediol, 1,6-hexanediol, 1,2,6-hexanetriol, glycerol and 2,2-bis(4-hydroxycyclohexyl)propane.

Polyglycidyl esters of polycarboxylic acids can also be used, which are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-napthalenedicarboxylic acid and dimerized linolenic acid. Examples are diglycidyl adipate, diglycidyl phthalate and diglycidyl hexahydrophthalate.

These polyepoxide compounds can also be used in mixtures with one another and, if appropriate, in mixtures with monoepoxides. Examples of suitable monoepoxides are: epoxidized monounsaturated hydrocarbons (butylene oxide, cyclohexene oxide, styrene oxide), epoxide ethers of monohydric phenols (phenol, cresol and other o- or p-substituted phenols), and glycidyl esters of saturated and unsaturated carboxylic acids.

Further suitable epoxides for the reaction are those containing amide or urethane groups, for example triglycidyl isocyanurate or glycidyl-blocked hexamethylene diisocyanate.

Further suitable epoxide compounds are derived from unsaturated fatty acids, for example from linoleic acids or linolenic acids. Examples of suitable epoxidized fatty acid derivatives are those from linseed oil, soya bean oil, alkyl esters of ricinene fatty acid, soya bean oil or linoleic fatty acid, oleic or arachidonic acid, and oligomeric fatty acids and their esters, and epoxidized alkyl esters having two or more ester groups are also suitable. Epoxidized linseed oil and soya bean oil are preferred.

Mixtures of the epoxides stated can likewise be employed. A precondition for all epoxides which can be employed within the scope of the present invention, where they have not been completely or partly reacted with monocarboxylic acids, is that they contain hydroxyl groups.

A detailed listing of the suitable epoxide compounds can be found in the handbook "Epoxidverbindungen und Epoxidharze" (Epoxide Compounds and Epoxy Resins) by A. M. Paquin, Springer Verlag, Berlin 1958, Chapter IV, in Lee, Neville "Handbook of Epoxy Resins", 1967, Chapter 2, and Wagner/Sarx, "Lackkunstharze" (Synthetic Coating Resins), Carl Hanser Verlag (1971), p. 174 et seq.

Provided they contain a sufficient number of hydroxyl groups, the polyepoxide compounds can be employed as such; however, it is often advantageous to react some of the reactive epoxide groups with a modifying material, in order to improve the film properties.

Plasticized epoxy resins with terminal epoxy groups are particularly preferred, which are prepared by partial reaction of the epoxy groups of epoxy resins containing at least two epoxy groups with OH- and COOH-containing substances, such as polyhydric alcohols, for example the abovementioned diols or phenols, polycarboxylic acids or polyesters containing carboxyl or OH groups, or by reaction with polyamines.

Possible epoxides containing hydroxyl groups, within the meaning of the present invention, are also reaction products of compounds having at least two 1,2-epoxide groups per molecule and epoxide equivalent weights of from 160 to 600, and aromatic dicarboxylic acids or mixtures thereof with compounds from the group comprising (cyclo)aliphatic dicarboxylic acids, monocarboxylic acids and/or monohydric phenols, and optionally cyclic anhydrides. Products of this type are described in EP-0 387 692, to which reference is made here. For the preparation of these reaction products it is possible to use all the epoxy compounds mentioned in the introduction.

Examples of aromatic dicarboxylic acids which are used are: terephthalic acid, isophthalic acid, o-phthalic acid or various naphthalenedicarboxylic acids, for example 2,6-naphthalenedicarboxylic acid. Terephthalic acid is particularly preferred here. Mixtures of aromatic dicarboxylic acids can also be employed.

Further suitable aromatic carboxylic acids are those of the type

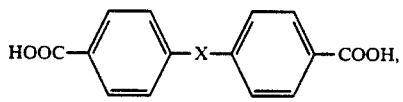

where X is a chemical bond or an alkylene radical having 1 to 6 carbon atoms, or is O or CO.

The term "(cyclo)aliphatic" dicarboxylic acids is intended to include corresponding aliphatic or cycloaliphatic acids and mixtures thereof.

Examples of aliphatic dicarboxylic acids, whose aliphatic radical generally contains from 1 to 20, preferably from 2 to 12, carbon atoms are succinic acid, glutaric acid, adipic acid, suberic acid, azelaic acid, sebacic acid and dodecanedioic acid.

Examples of suitable cycloaliphatic carboxylic acids, whose cycloaliphatic radical usually comprises from 5 to 12, preferably from 6 to 8, carbon atoms are the various cyclohexanedicarboxylic acid isomers, hexahydrophthalic acid and tetrahydrophthalic acid.

Examples of suitable monocarboxylic acids, which generally have from 3 to 20, preferably from 3 to 12, carbons are: benzoic acid, α- or β-naphthoic acid, o-, m- or p-toluic acid, anisic acid and veratric acid; also suitable are branched or unbranched aliphatic monocarboxylic acids, such as, for example, acetic acid, propionic acid, butyric acid, lauric acid, stearic acid, Versatic acid, isooctanoic acid, isononanoic acid or hydroxymonocarboxylic acids, such as glycolic acid, lactic acid and dimethylolpropionic acid.

The monohydric phenols can be mono- or polycyclic. Examples are: phenol, o-, m- or p-cresol, xylenols, guaiacol, thymol, carvacrol, α- or β-naphthol, p-butylphenol etc.

If the acid component represents a mixture of an aromatic dicarboxylic acid with (cyclo)aliphatic dicarboxylic acids, monocarboxylic acids and/or aromatic alcohols, then the amount of these constituents, which are present in addition to the aromatic dicarboxylic acid, is usually from 0.1 to 20% by weight, preferably from 1 to 5% by weight, based on the aromatic dicarboxylic acid.

The epoxy and the acid components are conventionally employed in amounts such that the ratio of equivalents of epoxide to carboxyl groups is from 6:5 to 2:1, preferably from 3:2 to 2:1. When cyclic anhydrides are also used, in general from 0.01–1 mol, preferably from 0.1–0.4 mol of cyclic anhydride are used per mole of reaction product of the epoxy and the acid component.

Suitable cyclic polycarboxylic acid anhydrides are expediently those containing from 4 to 20, preferably from 4 to 10, carbon atoms, which may optionally also carry substituents, such as halogen, in particular chlorine, and carboxyl groups. They may be derived from (cyclo)aliphatic, olefinically unsaturated or aromatic polycarboxylic acids. Examples are: succinic anhydride, alkylenesuccinic anhydrides such as, for example, dodecenylsuccinic anhydride, glutaric anhydride, maleic anhydride or citraconic anhydride.

The molecular weight (weight average) of all the epoxides on which the coating compositions according to the invention are based, determined by means of gel chromatography (polystyrene standard), is conventionally in the range from about 300 to about 50,000, preferably from about 300 to about 30,000.

The epoxides, or epoxides modified with monocarboxylic acids, according to the invention have hydroxyl numbers of from 20–600, in particular 50–400.

Provided they contain a sufficient number of hydroxyl groups, these epoxide compounds may be reacted directly with acetoacetic acid derivatives; otherwise they are partially or completely esterified beforehand with the abovementioned monocarboxylic acids, the epoxide group being opened, to give hydroxyl group-containing products which only then are subjected to reaction with the acetoacetic acid derivatives.

The subsequent esterification of the hydroxyl groups of the hydroxyl group-containing epoxide adduct or epoxide-acid adduct to give acetoacetates is carried out as a rule by reaction with monomeric acetoacetic acid esters such as, for example, methyl, ethyl or tert-butyl acetoacetate. The degree of esterification of the hydroxyl groups can be varied here over a wide range, depending on the properties desired in the end product.

The transesterification is carried out by heating both components together at boiling and slowly, if appropriate under vacuum, distilling off the lower-boiling alcohol which is formed.

For cost reasons, a stoichiometric and quantitative reaction with respect to the amount of acetoacetate is preferred.

However, the esterification of the hydroxyl groups can also be carried out with equivalents of acetoacetic acid, such as for example, diketene or 2,2,6-trimethyl-1,3-dioxan-4-one.

This reaction is carried out in solution or in bulk at temperatures between RT and and 150° C.; if required, an additional catalyst may also be used.

The binder component thus obtained, in the form of the polymer containing acetoacetate groups, is mixed with a curing agent in the form of a blocked polyamine. The molar ratio of blocked polyamines to the polymer containing acetoacetate groups is 0.5:1.5, in particular 1 to 1.5:1.

Examples of typical polyamines which can be used in accordance with the invention in the form of their aldimines or ketimines as the second component are aliphatic, aromatic or cycloaliphatic amines having from 2–10 primary and/or secondary amino groups, preferably from 2-4 primary amino groups and from 2-200 carbon atoms.

Examples of suitable polyamines are ethylenediamine, propylenediamine, butylenediamine, pentaethylenediamine, 2-methylpentamethylenediamine, trimethylhexamethylenediamine, hexamethylenediamine, decamethylenediamine, 4,7-dioxadecane-1,10-diamine, dodecamethylenediamine, 4,9-dioxadodecane-1,12 -diamine, 7-methyl-4,10 -dioxatridecane-1,13-diamine, 1,2-diaminocyclohexane, 1,4-diaminocyclohexane, 4,4'-diaminodicyclohexylmethane, isophoronediamine, bis(3-methyl-4-aminocyclohexyl)methane, 2,2-bis (4-aminocyclohexyl) propane, nitrilotris(ethanamine), bis(3-aminopropyl)methylamine, 3-amino-1-(methylamino)propane, 3-amino-1-(cyclohexylamino)propane, N-(2-hydroxyethyl)ethylenediamine and polyamines of the formula $H_2N—(R_2—NH)_n—R_1—NH_2$, in which the group $R_1$ and the n groups $R_2$ are identical or different and are an alkyl group containing from 2-6, preferably from 2-4, carbon atoms, and n is a number from 1-16, preferably from 1-3. An alkyl group is here understood to include a cycloalkyl group or an alkyl group containing one ether oxygen atom. Examples of suitable polyalkyl polyamines are diethylenetriamine, dipropylenetriamine, dibutylenetriamine and bishexamethylenetriamine. These polyamines preferably contain from 5-15 carbon atoms.

Further suitable polyamines according to the invention are the adducts of amino compounds or polyamines of the above-described type with a polyfunctional epoxide, isocyanate, maleate or fumarate or with an acryloyl compound or methacryloyl compound.

Examples of suitable epoxy compounds, which may be solid or liquid, are the di- or polyglycidyl ethers of (cyclo)aliphatic or aromatic hydroxy compounds, such as ethylene glycol, glycerol or cyclohexanediol (or the epoxides as mentioned in the introduction), or cycloaliphatic epoxy compounds such as epoxidized styrene or divinylbenzene which may subsequently be hydrogenated; glycidyl esters of fatty acids, containing for example from 6-24 carbon atoms; glycidyl (meth)acrylate; epoxy compounds containing an isocyanurate group; an epoxidized polyalkadiene such as, for example, epoxidized polybutadiene; hydantoin epoxy resins; epoxy resins obtained by epoxidation of aliphatic and/or cycloaliphatic alkenes, such as, for example, dipentene dioxide, dicyclopentadiene dioxide and vinylcyclohexene dioxide, and resins containing glycidyl groups, for example polyesters or polyurethanes containing one or more glycidyl groups per molecule, or mixtures of the abovementioned epoxy resins. The epoxy resins are known to those skilled in the art and require no further description here.

The epoxy resins should preferably be a diglycidyl ether based on a 2,2-bis(4-hydroxyphenyl)propane. The preferred epoxide equivalent weight of the epoxy resins is in the range from 87-6000, preferably from 120-1000.

Examples of suitable isocyanate compounds are: polyisocyanates such as tetramethylene diisocyanate, hexamethylene diisocyanate, 2,2,4-trimethylhexamethylene diisocyanate, 1,12-dodecanediisocyanate, 1,3- and 1,4-cyclohexane diisocyanate, 1-isocyanato-3,3,5-trimethyl-5-isocyanatomethylcyclohexane (=isophorone diisocyanate, IPDI), 2,4'- and/or 4,4'-perhydrodiphenylmethanediisocyanate, 1,3- and 1,4-phenylene diisocyanate, 2,4- and 2,6-tolylene diisocyanate, 2,4'- and/or 4,4'-diphenylmethanediisocyanate, 3,2'- and/or 3,4'-diisocyanato-4-methyldiphenylmethane, 1,5-naphthylene diisocyanate, 4,4',4''-triphenylmethane triisocyanate or mixtures of these compounds.

In addition to these simple isocyanates, those containing hetero atoms in the radical linking the isocyanate groups are also suitable. Examples of these are polyisocyanates containing carbodiimide groups, allophanate groups, isocyanurate groups, urethane groups, acylated urea groups and biuret groups.

Particularly well suited are the known polyisocyanates which are employed predominantly in the production of coatings, for example biuret, isocyanurate or urethane group-containing modification products of the abovementioned simple polyisocyanates, in particular tris(6-isocyanatohexyl)biuret, or low molecular weight polyisocyanates containing urethane groups, as can be obtained by reacting IPDI, employed in excess, with simple polyhydric alcohols in the molecular weight range from 62-300, in particular with trimethylolpropane. Of course it is also possible to employ any desired mixtures of the polyisocyanates mentioned.

Further suitable polyisocyanates are the known prepolymers containing terminal isocyanate groups, as can be obtained in particular by reacting the abovementioned simple polyisocyanates, especially diisocyanates, with excess amounts of organic compounds having at least two groups which are reactive toward isocyanate groups. Those used include in particular compounds containing a total of at least two amino groups and/or hydroxyl groups, of the molecular weight range from 300 to 10,000, preferably 400 to 6,000. It is preferred to use the corresponding polyhydroxy compounds, for example those hydroxypolyesters, hydroxypolyethers and/or hydroxyl group-containing acrylate resins which are known per se in polyurethane chemistry.

In these known prepolymers, the ratio of isocyanate groups to NCO-reactive hydrogen atoms is from 1.05 to 10:1, preferably from 1.1 to 3:1, the hydrogen atoms preferably deriving from hydroxyl groups.

Examples of suitable polyfunctional acryloyl compounds or methacryloyl compounds include the (meth)acrylic esters of di-, tri- or poly-hydroxy compounds, including polyester-diols or -polyols and polyether-diols or -polyols; adducts of a hydroxyl group-containing (meth)acrylic ester of a polyol with an at least bifunctional isocyanate compound or epoxy compound; and adducts of (meth)acrylic acids with an at least bifunctional epoxy compound. The compounds under consideration are designated here in shortened form as poly(meth)acryloyl compounds. Examples of suitable (meth)acrylic esters of di-, tri- or poly-hydroxy compounds are ethylene glycol, propylene glycol, diethylene glycol, tetramethylenediol, neopentyl glycol, hexamethylenediol, cyclohexanediol, 4,4'-dihydroxybenzophenone, bis(4-hydroxycyclohexyl)methane, glycerol, trimethylolpropane and pentaerythritol. These esters preferably contain one hydroxyl group. The (meth)acrylic esters containing hydroxyl groups, from which the adduct with the at least bifunctional isocyanate compound or epoxy compound can be formed, are the (meth)acrylic esters of polyols, as already mentioned above. Examples of an at least bifunctional isocyanate or epoxy compound which are suitable for forming the abovementioned adduct are those isocyanate and epoxy compounds already mentioned as a component in the adduct of an amino compound with a polyfunctional isocyanate or epoxy compound. The poly(meth)acryloyl compound normally has an equivalent weight of from 85-5000, preferably from 100-1000.

For use in the coating composition according to the invention, the amino groups in the above-described polyamines are blocked by an aldehyde or ketone having not more than 18 carbon atoms, preferably 3-10 carbon atoms. Examples of suitable blocking reagents are acetone, diethyl ketone, methyl isopropyl ketone, diisobutyl ketone, methyl tert-butyl ketone, methyl isobutyl ketone, methyl ethyl ketone, isobutyraldehyde, hydroxybutyraldehyde, pentanone, cyclohexanone, ethyl amyl ketone, hydroxycitronellal, isophorone and decanone. An aliphatic or cycloaliphatic ketone having from 3-12 carbon atoms should preferably be used. The blocking of the amino groups is known and requires no further description. The blocked polyamines conventionally have an average molecular weight of from 250-4000, preferably from 300-2000.

The curable liquid coating compositions according to the invention may optionally contain a diluent, such as conventional inert organic solvents. Examples are: halogenated hydrocarbons, ethers, such as, diethyl ether, 1,2-dimethoxyethane, tetrahydrofuran or dioxane; ketones, such as, for example, methyl ethyl ketone, acetone, cyclohexanone and the like; alcohols, such as methanol, ethanol, propanol, methoxypropanol, butanol and benzyl alcohol, (cyclo)aliphatic and/or aromatic solvents in the boiling range from about 150° to 180° C. (higher-boiling mineral oil fractions, such as Solvesso ®) or esters, such as butyl acetate. The solvents can be employed individually or in a mixture.

Conventional additives which may possibly be present in the liquid coating compositions according to the invention are—depending on the particular intended use—the conventional coating additives such as pigments, pigment pastes, antioxidants, leveling and thickening agents, flow assistants, antifoams and/or wetting agents, fillers, catalysts, additional curing agents and additional curable compounds, etc. These additives can if appropriate be added to the mixture only immediately prior to processing.

On account of their favorable properties—in particular the rapid curing even at low temperatures—the mixtures according to the invention can be used in diverse industrial applications, for example in the production of molded articles (casting resins) for tool manufacture or in the production of final and/or intermediate coatings on a wide variety of substrates, for example on those of organic or inorganic nature, such as, for example, wood, textiles, plastics, glass, ceramics or building materials, but in particular on metal. Furthermore the mixtures according to the invention can be employed as constituents of paints and coatings for coating industrial articles and domestic appliances, such as, for example, refrigerators, washing machines, electrical devices, windows and doors. Application can be carried out by, for example, brushing, spraying, dipping etc.

A preferred area of application for the mixtures according to the invention is in coating preparations.

The curing of the mixtures according to the invention proceeds very rapidly and is in general carried out at from −10° to 150° C., preferably from 0° to 140° C.

The curing reaction can be carried out in one step, for example by using equivalent proportions of the components. The pot-life and the properties of the product are therefore dependent on the process conditions, i.e. on the nature and amount of the starting materials, on the temperature regime, etc.. For instance, the elasticity of the crosslinked product can be controlled within a range of tolerances for example via the chain length of the oligomers and/or polymers employed. Although as a rule the curing is carried out noncontinuously, it is also within the scope of the invention to proceed continuously with the mixing of the components and the course of the reaction, for example using an automatic coating appliance.

The above-described binders are surprisingly, despite being comparable in their molecular weights and in their functionalities with the binders of EP 199 087 (example for comparison is Example G; $M_n$ 3400, EW 960, calculated functionality: 5.9), of higher reactivity, as manifested by the shorter gel time and the improved solvent resistance. It is known from the literature (XIX. Fatipec Congress, 1988, Volume III, p. 137 et seq.) that carboxylic acids accelerate the crosslinking reaction; it is therefore surprising that, in the present case, although these binders contain amino groups which make the overall system more basic, an accelerated reaction is observed.

The coatings obtained are additionally notable for improved solvent resistance (the coating film can be reworked sooner) and for greater elasticity (Erichsen indentation).

PREPARATION OF BINDER COMPONENT A

Example A1

940 parts of Beckopox EP 304 (tradename of Hoechst AG for a diglycidyl ether based on bisphenol A, epoxide content: about 1.8%) and 118 parts of xylene were heated under nitrogen at 110° C. in a 4 l four-necked flask fitted with a stirrer, thermometer, reflux condenser and dropping funnel.

After adding 0.7 parts of triethanolamine, 156 parts of Versatic acid (tradename of Shell for an alpha-branched monocarboxylic acid, acid number: about 326 mg of KOH/g) were then added dropwise over 30 min at the same temperature. The mixture was subsequently stirred at 140° C. until an acid number <1 was reached. The solvent was distilled off under a water-jet vacuum and the residue then taken up in 500 parts of ethyl acetoacetate.

The mixture was then heated at reflux for 3 h; subsequently the volatile constituents were distilled off over 3 h, initially at atmospheric pressure and then under vacuum, up to a bottom temperature of 150° C. The last remnants of unreacted acetoacetate were then removed at the same temperature by passing in steam.

The residue was dissolved in butyl acetate and diluted to a solids content of 60%. A yellow resin solution was obtained having an equivalent weight of about 1200 g/mol and a viscosity of 1100 mPa.s (average molecular weight $M_n = 3300$).

Example A2

705 parts of Beckopox EP 304 (tradename of Hoechst AG for a diglycidyl ether based on bisphenol A, epoxide content: about 1.8%) and 465 parts of ethyl acetoacetate were heated at reflux under nitrogen for 3 h in a 4 l four-necked flask fitted with a stirrer, thermometer, reflux condenser and dropping funnel.

Subsequently the volatile constituents were distilled off over 3 h, initially at atmospheric pressure and then under vacuum, up to a bottom temperature of 150° C. The last remnants of unreacted acetoacetate were then removed by passing in steam.

The residue was dissolved in butyl acetate and diluted to a solids content of about 60%. A yellow resin solution was obtained having an equivalent weight of about 1400 g/mol and a viscosity of 1300 mPa.s and an epoxide content of 0.8% (average molecular weight $M_n=2495$).

Example A3

1048 parts of Beckopox EP 303 (tradename of Hoechst AG for a diglycidyl ether based on bisphenol A, epoxide content: about 2.2%) and 692 parts of ethyl acetoacetate were heated at reflux under nitrogen for 3 h in a 4 l four-necked flask fitted with a stirrer, thermometer, reflux condenser and dropping funnel.

Subsequently the volatile constituents were distilled off over 3 h, initially at atmospheric pressure and then under vacuum, up to a bottom temperature of 150° C. The last remnants of unreacted acetoacetate were then removed by passing in steam.

The residue was dissolved in butyl acetate and diluted to a solids content of about 60%. A yellow resin solution was obtained having an equivalent weight of about 1600 g/mol and a viscosity of 1100 mPa.s (average molecular weight $M_n=2215$).

Example A4

560 parts of Beckopox EP 307 (tradename of Hoechst AG for a diglycidyl ether based on bisphenol A, epoxide content: about 0.9%) and 390 parts of ethyl acetoacetate were heated at reflux under nitrogen for 3 h in a 4 l four-necked flask fitted with a stirrer, thermometer, reflux condenser and dropping funnel.

Subsequently the volatile constituents were distilled off over 3 h, initially at atmospheric pressure and then under vacuum, up to a bottom temperature of 150° C. The last remnants of unreacted acetoacetate were then removed by passing in steam.

The residue was dissolved in butyl acetate and diluted to a solids content of about 60%. A yellow resin solution was obtained having an equivalent weight of about 1200 g/mol and a viscosity of 4500 mPa.s (average molecular weight $M_n=4160$).

PREPARATION OF CURING COMPONENT B

Example B1

206 parts of diethylenetriamine, 440 parts of methyl isobutyl ketone, 162 parts of xylene and 2.6 parts of formic acid were heated at reflux in a 2 l four-necked flask fitted with a reflux condenser, stirrer and water separator. After removing about 72 ml of water, the mixture was cooled to 85° C., and 397 parts of Beckopox EP 140 (tradename of Hoechst AG for a diglycidyl ether based on bisphenol A, epoxide content: about 8.6%) were added over 30 min. After reaching an epoxide content of <0.5%, the solids content was adjusted to 75% with 99 parts of xylene. A pale yellow resin solution having a viscosity of 620 mPa.s and an amine content of 6.9% is obtained.

PREPARATION OF THE PRIMER COATINGS

The binder according to the invention and a binder from EP 0 199 087 for comparison were mixed in the proportions in the following table with the pigment mixture, the additives and the solvent and milled.

The pigment composition given in the examples comprises 100 parts of kaolin, 100 parts of blanc fixe, 50 parts of titanium dioxide and 50 parts of talc.

Bentone 10% is a suspension in xylene; Additol XL 270 is a tradename of Hoechst AG for a commercial antisettling agent.

The Comparison Example corresponds to Example G from EP 0 199 087.

PROCESSING 100 parts of the above coating were mixed with the stated amount of curing agent and diluted to spray viscosity with butyl acetate. The ready-to-spray coating thus obtained was applied to degreased and cleaned metal test panels. After drying at room temperature, the sand-ability and the resistance to gasoline and butyl acetate were tested after 4 h.

| Examples | Applications testing and comparison | | | |
|---|---|---|---|---|
| | 1 | 2 | 3 | Comparison |
| Binder component | | | | |
| A1 | 125 | | | |
| A2 | | 125 | | |
| A3 | | | 125 | |
| Comp. | | | | 125 |
| Pigment mixture | 300 | 300 | 300 | 300 |
| Bentone (10% in xylene) | 17.5 | 17.5 | 17.5 | 17.5 |
| Additol XL 270 | 3.5 | 3.5 | 3.5 | 3.5 |
| Butyl acetate | 155 | 155 | 155 | 155 |
| Curing agent B1/100 coating | 7 | 7.1 | 6.3 | 6.3 |
| Results: | | | | |
| Gel time (min): | 105 | 90 | 100 | 120 |
| Sandability: | 2 | 1–2 | 2 | 2 |
| Resistance* to Gasoline** after 4 h: | 2 | 2 | 2 | 3 |
| Butyl acetate** after 4 h: | 3 | 2 | 2–3 | 4 |
| Distilled water*** after 10 d: | 1 | 1 | 1 | 1 |
| 10% sodium hydroxide solution*** after 10 d: | 1 | 1 | 1 | 1 |
| Erichsen indentation (mm) | 7.0 | 6.8 | 6.0 | 2.5 |

\* visual assessment, 0 = very good
\*\* duration of action 30 sec
\*\*\* duration of action 12 h

I claim:

1. A liquid coating composition comprising a polymer containing acetoacetate groups and a polyamine in the form of its corresponding aldimine or ketimine, wherein the polymer containing acetoacetate groups is obtained by reacting a polyepoxide containing hydroxyl groups, or a polyepoxide which is partially reacted with monocarboxylic acids, with acetoacetic acid esters, diketene or 2,26-trimethyl-1,3dioxane-4-one.

2. A liquid coating composition as claimed in claim 1, wherein the polyepoxide is a diglycidyl ether of bisphenol A and/or bisphenol F.

3. A liquid coating composition as claimed in claim 1, wherein the polyepoxide is partly reacted with polyalcohols, polycarboxylic acids or polyamines.

4. A liquid coating composition as claimed in claim 1, wherein the polyepoxide is a polyepoxide based on bisphenol A and/or bisphenol F which is partly reacted with polyalcohols, polycarboxylic acids or polyamines.

5. A liquid coating composition as claimed in claim 1, wherein the polyepoxide is reacted with lauric acid, stearic acid, Versatic acid or ethylhexanoic acid.

6. A liquid coating composition as claimed in claim 1, wherein the polyamine, in the form of its corresponding aldimine or ketimine, is a reaction product of a polyamine with a polyepoxide or a polyisocyanate.

7. A liquid coating composition as claimed in claim 1, wherein the polyamine, in the form of its corresponding aldimine or ketimine, is a reaction product of a polyamine with a polyepoxide based on bisphenol A and/or bisphenol F.

8. A liquid coating composition as claimed in claim 1, wherein the polyamine, in the form of its corresponding aldimine or ketimine, is a compound of the formula $$H_2N-(R_2-NH)_n-R_1-NH_2,$$

in which $R_1$ and $R_2$ are identical or different and are $C_2$-$C_6$-alkyl and n is a number from 1 to 16.

9. A liquid coating composition as claimed in claim 1, wherein the polyepoxide has a weight average molecular weight of from 300 to 50,000.

10. In a method of forming a coating on a substrate, the improvement comprising using as a liquid coating composition the composition of claim 1.

11. A two component filler composition for automotive refinishing containing as one component a liquid coating composition of claim 1.

12. A two component primer composition for automobiles containing as one component a liquid coating composition of claim 1.